UNITED STATES PATENT OFFICE.

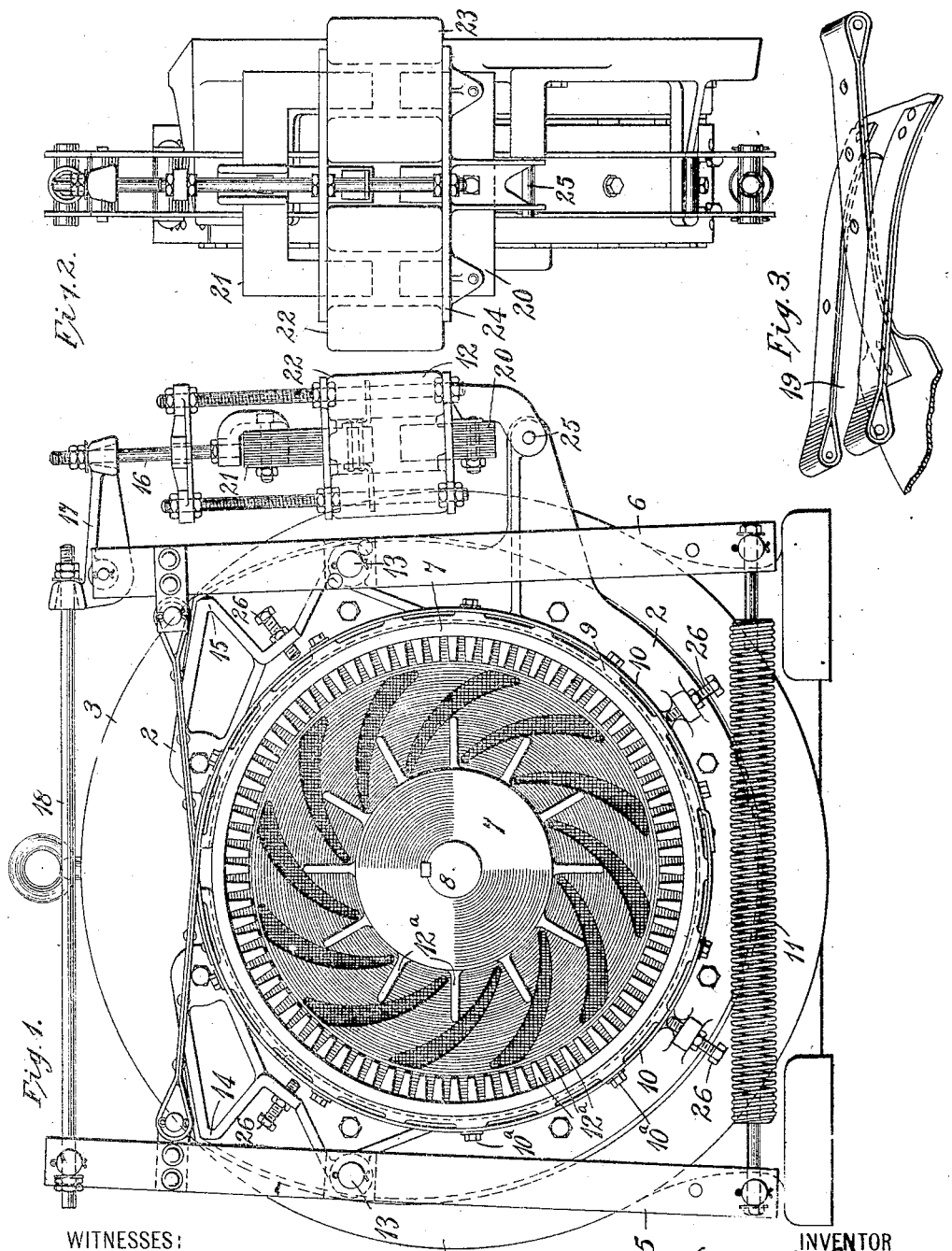

HARRY A. STEEN, OF PITTSBURGH, PENNSYLVANIA, ASSIGNOR, BY MESNE ASSIGNMENTS, TO WESTINGHOUSE ELECTRIC AND MANUFACTURING COMPANY, OF EAST PITTSBURGH, PENNSYLVANIA, A CORPORATION OF PENNSYLVANIA.

WHEEL-BRAKE.

1,125,759.   Specification of Letters Patent.   Patented Jan. 19, 1915.

Application filed October 20, 1908. Serial No. 458,614.

*To all whom it may concern:*

Be it known that I, HARRY A. STEEN, a subject of the King of Norway, and a resident of Pittsburgh, in the county of Allegheny and State of Pennsylvania, have invented a new and useful Improvement in Wheel-Brakes, of which the following is a specification.

My invention relates to wheel brakes and contact shoes therefor, and it has for its object to provide an improved device of this character that shall be simple and durable in construction and adapted to produce a maximum braking effect with a minimum amount of applied power.

When electric driving motors are used with elevators and hoists, it is desirable to provide a braking device by which the motor is promptly and automatically brought to rest upon the interruption of the electric supply circuit connections or in case of accident to the mechanical parts. This result is usually accomplished by providing a spring or some similar mechanical means for applying the brake and an electro-responsive device for releasing the brake. Band brakes have been employed for these purposes but equal retarding forces have not heretofore been obtained for both directions of motor rotation without sacrificing the efficiency of the brakes. The effectiveness of band brakes is, however, well known and my improved device is of this general type, the structural details being designed to avoid the difficulties of the prior art.

It has been my aim to so improve the structure of the contact member of the brake that a greater retarding effect may be obtained by means of a much weaker spring, thereby permitting the use of a much cheaper and lighter electro-magnet for releasing the brake. Those familiar with the art will understand that the cost of the release magnet largely determines the cost of the whole device, since the mechanical features of the brake are usually simple and inexpensive.

My improved stationary contact member comprises, in general, a single shoe of cast iron or similar material, which is in the form of an interrupted ring, and is adapted to engage all but a very small part of the circumference of the wheel when the brake is applied. The contact surface of the shoe is so finished that its diameter is slightly greater than that of the wheel, thereby causing the shoe to readily release itself from the outer surface of the wheel as soon as the pressure tending to apply the brake is relieved. A steel band is wrapped completely around the outside of the shoe, to which it is secured, the ends of the band being crossed and secured to levers through which forces are transmitted for bringing the cast iron shoe into engagement with the wheel.

While it is, of course, desirable to reduce the current required to operate direct current brake magnets, it is of much greater importance with alternating current brake magnets for the following reasons: The inductive resistance of the alternating current magnet prohibits a series connection between the motor and the magnet and, consequently, the energy required for the magnet is an additional load on the supply circuit. This additional load is particularly heavy when the motor is started and when the air gap of the brake magnet is a maximum; furthermore, the effect on the power factor of the load is greater or less according to the percentage of the total load required for the magnet.

Figure 1 of the accompanying drawings is a side elevation of a brake constructed in accordance with my invention. Fig. 2 is an end elevation of the brake shown in Fig. 1, and Fig. 3 is a perspective view of a portion of the steel band which forms a part of the contact member of the brake.

Referring to the drawings, the device here illustrated comprises a stationary bracket 2, which is adapted to be secured to the frame 3 of an electric motor 4, levers 5 and 6 which are pivoted at intermediate points in their lengths upon the stationary bracket 2, a brake wheel 7, which is mounted on the shaft 8 of the electric motor 4, a shoe 9, which engages the outer surface of the wheel 7, a steel band 10, which is wrapped completely around the shoe 9 and is secured to it by bolts $10^a$, a spring 11, by which the brake is applied, and an electro-magnet 12, which acts to release the brake, when energized.

The wheel 7 is preferably provided with a plurality of vanes or projections 12ª, which tend to improve its ventilation. The levers 5 and 6 are fulcrumed near their middle points upon stationary shafts 13, and are connected at their lower ends by the spring 11, which is under tension, their upper ends being securely fastened to the extremities of the steel band 10. By this means, the pull exerted by the spring 11 on the ends of the band tends to force the shoe 9 into engagement with the outer surface of the wheel 7.

In order to maintain the desired relation between the several parts of the brake, when it is applied to the motor, under high speed or slow speed conditions of operation, in either direction, the bracket 2 is provided with projections 14 and 15, that constitute rigid stops for the levers 5 and 6 and take the reaction produced by the retarding forces.

It will be understood that, while the spring pressure may be relatively slight, the tension on the band 10 is very great, when the brake is in operation and the wheel 7 is rotating, and this high tension would necessitate a relatively heavy and cumbersome lever construction except for the fact that the stops 14 and 15 are so located as to engage the levers very close to their points of connection with the ends of the band. Since the stops are symmetrically arranged and act similarly for opposite directions of wheel rotation, the brake structure is particularly well adapted for use with rotating parts which are frequently reversed in direction. The shoe 9 is so secured to the band that it may be readily removed and replaced when worn.

The brake may be released by energizing the electro-magnet 12 which exerts its force, through a connecting rod 16, upon one end of a bell crank lever 17 that is pivoted upon the upper end of the lever 6 and the other end of which is connected to the corresponding end of the lever 5 by means of a rod 18. The band 10 is provided with a slot 19 at one end through which the narrow opposite end projects.

The electro-magnet 12 may be of any suitable design which will be determined by the character of the energy which is applied to its windings, the magnet illustrated in the drawings comprising a pair of E shaped core members 20 and 21, magnet coils 22 and 23 and a frame structure 24. The core member 20 is pivoted upon a shaft 25 which projects laterally from an arm 25 of the bracket 2. The core member 21 is movable relative to the core member 20 and is secured to one end of the connecting rod 16. The arrangement of the parts is such that the free ends of the core structure are slightly separated when the brake is applied and are close together when the coils 22 and 23 are energized and the brake is released.

In order to maintain a concentric relation between the wheel and the brake shoe, I provide a plurality of adjustable stops 26 which limit the separation between the two parts at several points about the circumference of the shoe.

It is conceivable that structural modifications may be effected within the spirit and scope of my invention.

I claim as my invention:

1. The combination with a brake wheel having a cylindrical rim surface and stationary levers fulcrumed at intermediate points located one at each side of the wheel, of a single shoe concentric with the rim of the wheel and slightly separated from its surface, a band wrapped about the shoe and secured thereto, and means for exerting equal and opposite forces on the levers to spring the shoe into engagement with the wheel, the ends of the said band being crossed and secured to the levers.

2. The combination with a brake wheel having a cylindrical rim surface and stationary levers fulcrumed at intermediate points located one at each side of the wheel, of a single shoe concentric with the rim of the wheel and slightly separated from its surface, a band wrapped about the shoe and secured thereto, and a tension spring connecting corresponding ends of the levers to force the shoe into engagement with the wheel, the ends of said band being crossed and secured to the other corresponding ends of the levers.

3. The combination with a brake wheel, of a single shoe adapted to engage the major portion of the wheel's circumference, a band secured to and wrapped around the shoe, adjustable stationary stops for maintaining a concentric relation between the shoe and the wheel when the brake is released and means for exerting tensional forces on the band to spring the shoe into engagement with the wheel, the inner diameter of the shoe being slightly greater than the outer diameter of the wheel.

4. The combination with a brake wheel and stationary levers fulcrumed at intermediate points and located one at each side of the wheel, of a single shoe concentric with the rim of the wheel and slightly separated from its surface, a band wrapped about the shoe and secured thereto, stops disposed between corresponding ends of the levers for limiting the movement of the levers and means for exerting equal and opposite forces on the levers to spring the shoe into engagement with the wheel, the ends of the said band being crossed and secured to the levers.

5. The combination with a brake wheel and stationary levers fulcrumed at intermediate points and located at diametrically opposite sides of the wheel, of a single shoe concentric with the rim of the wheel and slightly separated from its surface, a band wrapped about the shoe and secured thereto, stationary stops disposed between corresponding ends of the levers and the rim of the wheel for limiting the movement of the levers and a spring joining the opposite ends of levers for forcing the shoe into engagement with the wheel, the ends of the band being crossed and secured to the levers.

6. A brake comprising a wheel, a contact band wrapped about the wheel, levers pivoted one on each side of the wheel and respectively connected to the ends of the band, a spring connecting corresponding ends of the levers for applying the band to the wheel, means for actuating said levers to release the band from the wheel, and stops for limiting the movement of the levers in order to resist the braking action in either direction of wheel rotation.

7. The combination with the brake wheel, of levers fulcrumed at substantially diametrically opposite points of said wheel, a single shoe adapted to engage said wheel, a band secured to and wrapped around said shoe, the ends of said band being crossed and secured to corresponding ends of said levers, a tension spring connecting the opposite ends of said levers, and means to move said levers against the tension of said springs.

In testimony whereof, I have hereunto subscribed my name this 15th day of Oct., 1908.

HARRY A. STEEN.

Witnesses:
R. J. DEARBORN,
BIRNEY HINES.